United States Patent [19]
Ahearn et al.

[11] Patent Number: 5,519,529
[45] Date of Patent: May 21, 1996

[54] INFRARED IMAGE CONVERTER

[75] Inventors: John S. Ahearn, Sykesville; John W. Little, Jr., Ellicott City, both of Md.

[73] Assignee: Martin Marietta Corporation, Bethesda, Md.

[21] Appl. No.: 193,979

[22] Filed: Feb. 9, 1994

[51] Int. Cl.$^6$ .......................................... G02F 1/03
[52] U.S. Cl. .......................................... 359/248; 250/332
[58] Field of Search .................................. 359/248, 247, 359/255, 262, 245, 246; 250/332

[56] References Cited

U.S. PATENT DOCUMENTS

| | | | |
|---|---|---|---|
| 4,810,978 | 3/1989 | Sato et al. | 332/7.51 |
| 5,047,822 | 9/1991 | Little, Jr. et al. | 357/30 |

FOREIGN PATENT DOCUMENTS

| | | |
|---|---|---|
| 0323073 | 12/1988 | United Kingdom . |
| 2251952 | 7/1992 | United Kingdom . |
| 9400884 | 1/1994 | WIPO . |

OTHER PUBLICATIONS

"Spatial Light Modulator and Optical Dynamic Memory Using A 6x6 Array of Self–Electro–Optic–Effect Devices", Livescu et al. AT&T Bell Laboratories, Holmdel & Murray Hill, N.J. Dec. 22, 1987, published in Optics Letters, vol. 13, No. 4, Apr. 1988.

V. Gorfinkle et al., "Rapid Modulation of Interband Optical Properties of Quantum Wells by Intersubband Absorption", *Applied Physics letters* vol. 60, pp. 3141–3143 (Jun. 22, 1992).

K. Hu et al., "All–Optical Photonic Switches Using Integrated Inverted Asymmetric Fabry–Perot Modulation and heterojunction Phototransistors" *IEEE Photonics Technology Letters* vol. 4, pp. 263–266 (Mar. 1992).

K.-K. Law et al., "Normally–Off High–Contrast Asymmetric Fabry–Perot Reflection Modulator Using Wannier–Stark Localization in a Superlattice", *Applied Physics letters* vol. 56, pp. 1886–1888 (May 7, 1990).

K.-K. Law et al., "Self–Electro–Optic Device Based on a Superlattice Asymmetric Fabry–Perot Modulator with an On/Off Ratio>100:1", *Applied Physics Letters* vol. 57, pp. 1345–1347 (Sep. 24, 1990).

*Semiconductor Quantum Wells and Superlattices for Long-–Wavelength Infrared Detectors*, M. O. Manasreh, ed., pp. 55–108, Artech House, Boston, Mass. (1993).

J. Switzer et al., "Electrodeposited Ceramic Superlattices", *Sci.* vol. 247, pp. 444–445 (Jan. 26, 1990).

C. Weisbuch et al., *Quantum Semiconductor Structures*, pp. 1–9, 57–100, Academic Press, Inc., San Diego, Calif. (1991).

*Primary Examiner*—Georgia Y. Epps
*Assistant Examiner*—Dawn-Marie Bey
*Attorney, Agent, or Firm*—Gay Chin; William H. Meise

[57] ABSTRACT

A device for converting a mid-wave infrared or long-wave infrared thermal image into a coherent near-infrared image includes a two-dimensional array of quantum-well-based optical modulators and infrared photodetectors. Each modulator is integrated or hybridized with a respective photodetector, and the combination is connected to an electronic circuit. Variations in mid-IR or long-IR light intensity are converted by each photodetector into variations in a bias applied to its respective modulator. The bias variations modulate the intensity and/or phase of near-IR light illuminating the modulators.

6 Claims, 6 Drawing Sheets

INFRARED IMAGE CONVERTER

BACKGROUND

This application relates to semiconductor quantum well devices for converting images from one spectral region into images in another spectral region.

Much work has been done recently on a wide range of electro-optic devices based on the electric-field dependence of strong absorption resonances in semiconductor quantum wells (QWs). In a QW, a thin layer of one semiconductor material is sandwiched between cladding layers of a different material, with the electronic properties of the materials being such that an electric potential well (in the central layer) is formed between two electric potential barriers (in the cladding layers). The Qw's small thickness, on the order of 100 Å, results in quantization of charge-carrier motion in the thickness direction.

Also, QWs exhibit the quantum-confined Stark effect, in which the wavelengths of the QW's peak optical absorptions associated with the creation of light- and heavy-hole excitons shift to longer wavelengths in response to an applied electric field. Since these peak excitonic absorptions have finite spectral widths due to electron/hole interactions with material impurities and phonons, the transmissivity of a QW at a wavelength near a peak varies as the applied field varies. These and other aspects of QW devices are described in commonly assigned U.S. Pat. No. 5,047,822 to Little, Jr., et at., which is expressly incorporated here by reference.

Because a single QW is so thin, devices are typically made by stacking a number of Qws, e.g., fifty, to obtain significant optical effects. Many aspects of multiple quantum well (MQW) devices are described in the literature, including C. Weisbuch et al., *Quantum Semiconductor Structures*, Academic Press, Inc., San Diego, Calif. (1991).

A simple MQW device is the absorption modulator, in which the excitonic absorption edge of the quantum wells is moved into and out of coincidence with the wavelength of a spectrally narrow light source, such as a laser, by varying an applied electric field. Thus, the intensity of the light transmitted or reflected by the modulator varies according to the applied electric field, or bias voltage, as noted above.

One such absorption modulator, although based on Wannier-Stark localization rather than the quantum-confined Stark effect, is described in K.-K. Law et at., "Normally-Off High-Contrast Asymmetric Fabry-Perot Reflection Modulator Using Wannier-Stark Localization in a Superlattice", *Applied Physics Letters* vol. 56, pp. 1886–1888 (May 7, 1990); and K.-K. Law et al., "Self-Electro-Optic Device Based on a Superlattice Asymmetric Fabry-Perot Modulator with an On/Off Ratio>100:1 ", *Applied Physics Letters* vol. 57, pp. 1345–1347 (Sep. 24, 1990). In contrast to the QW's shift of the excitonic absorption peaks to longer wavelengths due to the quantum-confined Stark effect, Wannier-Stark localization leads to a shift to shorter wavelengths for increased electric field in superlattice structures.

In general, a superlattice is a stack of interleaved thin barrier layers and QWs in which the QWs are resonantly coupled, causing the Qws' discrete charge-carder energy levels to broaden into minibands. Applying an electric field destroys the resonance, misaligning the energy levels in neighboring Qws and localizing them over a few Qws. This changes the optical absorption spectrum from a smooth, miniband profile to a peaked, QW-excitonic profile and blue-shifts the absorption edge.

As described in more detail below, Applicants' invention can be embodied using either MQW or superlattice structures. Also, it will be understood that such structures described in this application can be fabricated by a wide variety of semiconductor processing methods, e.g., metal-organic chemical vapor deposition, molecular beam epitaxy, and electrochemical deposition methods. See, e.g., J. Switzer et al., "Electrodeposited Ceramic Superlattices", *Sci.* vol. 247, pp. 444–445 (Jan. 26, 1990); and the abovecited Weisbuch et al. book.

Simple MQW absorption modulators operating at room temperature can exhibit modulation depths, i.e., ratios of minimal to maximal absorptions, of about 10:1 to 30: 1. These low modulation depths can be improved by combining an MQW structure with a suitable resonant optical cavity, such as an asymmetric Fabry-Perot etalon (ASFPE). An ASFPE is a resonant optical cavity formed by two planar mirrors that have different reflectivities. Such devices are described in commonly assigned U.S. patent application Ser. No. 08/109,550 filed Aug. 20, 1993, by Terranee L. Worchesky and Kenneth J. Ritter, which is expressly incorporated here by reference.

Another application of QWs is the quantum well infrared photodetector (QWIP). In the QWIP described in the literature, including *Semiconductor Quantum Wells and Superlattices for Long-Wavelength Infrared Detectors*, M. O. Manasreh, ed., pp. 55–108, Artech House, Boston, Mass. (1993), internal photoemission of electrons from bound states in GaAs QWs into high-mobility channels in the QWIP's cladding layers increases the conductivity of the QWIP in the presence of thermal light, i.e., long-wave infrared (LWIR) wavelengths from about 8000 nm to about 12000 nm or mid-wave infrared (MWIR) wavelengths from about 3000 nm to about 5000 nm. The light is detected as an increase in the current flowing through the QWIP when operated at a fixed bias voltage. The characteristics of the QWIP (e.g., the peak-response wavelength, the optical bandwidth, and the electrical properties) are determined by the widths of the QWs (usually in the 4- to 8-nm width range) and the composition of the cladding layers (nominally thick layers of $Al_{(x)}Ga_{(1-x)}As$, with x ranging from 0.2 to 0.6).

Like a charge-coupled device (CCD) imager, arrays of QWIPs can be provided to form thermal images. In a conventional thermal imaging system, an array of detector elements is mated to a silicon multiplexer that reads out the current from each element sequentially in a "bucket brigade" fashion (i.e., the charge is collected from each element into a capacitor and then passed along a row of capacitors to a column-readout capacitor bank which passes it down to a single charge-measuring element on the multiplexer). The original position of each charge packet is tracked, and the image is reconstructed electronically, usually as a video image on a monitor.

Multiplexers optimized for the electrical characteristics of QWIPs are not currently available. The multiplexers that have been used are not well suited for the relatively high dark current typical of QWIPs operating at temperatures around that of liquid nitrogen, and greatly increase the cost of the imaging system. Further, because the multiplexers are made from silicon instead of GaAs, the thermal-expansion-coefficient mismatch limits the arrays' physical sizes to well below the limit imposed by GaAs crystal-growth and processing technology. In addition, the multiplexers must also be cooled since they must be located as close to the detectors as possible, but the multiplexers' thermal mass and heat dissipation strain conventional cooling systems.

Applicants have recognized that the current flowing through a QWIP can be used to provide the bias necessary for an MQW modulator. In such a device, the change in QWIP current due to a change in the amount of MWIR or LWIR light illuminating the QWIP will change the amount or phase of near-infrared (NIR) light, i.e., wavelengths from about 800 nm to about 2000 nm, reflected or transmitted from the MQW modulator. The change in intensity of LWIR or MWIR light is thus converted into a change in intensity or phase of NIR light.

The publication, V. Gorfinkle et at., "Rapid Modulation of Interband Optical Properties of Quantum Wells by Intersubband Absorption", *Applied Physics Letters* vol. 60, pp. 3141–3143 (Jun. 22, 1992), describes the theory of a doped MQW absorption modulator in which the interband absorption strength for NIR photons would be modulated by intersubband absorption of LWIR photons. The LWIR absorption would partially deplete the population of carriers in the ground state, thereby changing the density of final states for NIR absorption.

A significant drawback of such a device for a purpose such as converting LWIR information into NIR information would be the interdependence of the operating LWIR and NIR wavelengths due to the absorptions occurring in the same MQW structure. Moreover, a very large LWIR flux and fabrication in a waveguide geometry are needed for significant NIR absorption modulation.

SUMMARY

Applicants' invention provides a device and a method for converting a mid-wave infrared (MWIR) or a long-wave infrared (LWIR) thermal image into a coherent near-infrared (NIR) image. The device includes a two-dimensional (2D) array of quantum-well infrared photodetectors (QWIPs), a 2D array of quantum-well optical modulators, and an electronic circuit. Variations in the intensity of LWIR or MWIR light incident on the array of QWIPs are converted into variations in the bias of the optical modulators. The bias variations result in changes in the intensity and/or the phase of NIR light reflected from (or transmitted through) the modulator array, thereby converting the LWIR or MWIR image into an NIR image.

In one aspect of Applicants' invention, a hybrid image converter comprises an infrared detector array section disposed on a first substrate, an electronics section disposed on a second substrate, and an optical modulator array section disposed on a third substrate. The electronics section is sandwiched between the infrared detector section and the optical modulator section and serves to convert photocurrents generated in the pixels of the infrared detector array into voltages applied to respective pixels of the optical modulator array.

In another aspect of Applicants' invention, an integrated image converter comprises an infrared detector array section and an optical modulator array section disposed on a first substrate (by disposing one of the sections on the substrate and disposing the other section on that section) and an electronics section disposed on a second substrate. Elements of the electronics section are electrically connected on a pixel-by-pixel basis to the elements of the integrated detector/modulator array using, for example, indium-bump bonding techniques.

Applicants' image converter has the advantages of independently-selectable operating wavelengths, sensitivity to low light intensities, and planar (rather than waveguide) geometry, making it ideally suited for a two-dimensional stating array. Since the NIR light source can be a laser, the resulting coherent NIR image can be used as the input for an optical signal processor capable of performing complex image analysis such as pattern recognition or background clutter rejection.

BRIEF DESCRIPTION OF THE DRAWINGS

The features and advantages of Applicants' invention will be better understood by reading the following detailed description in conjunction with the drawings in which.

DETAILED DESCRIPTION

Figure 1:
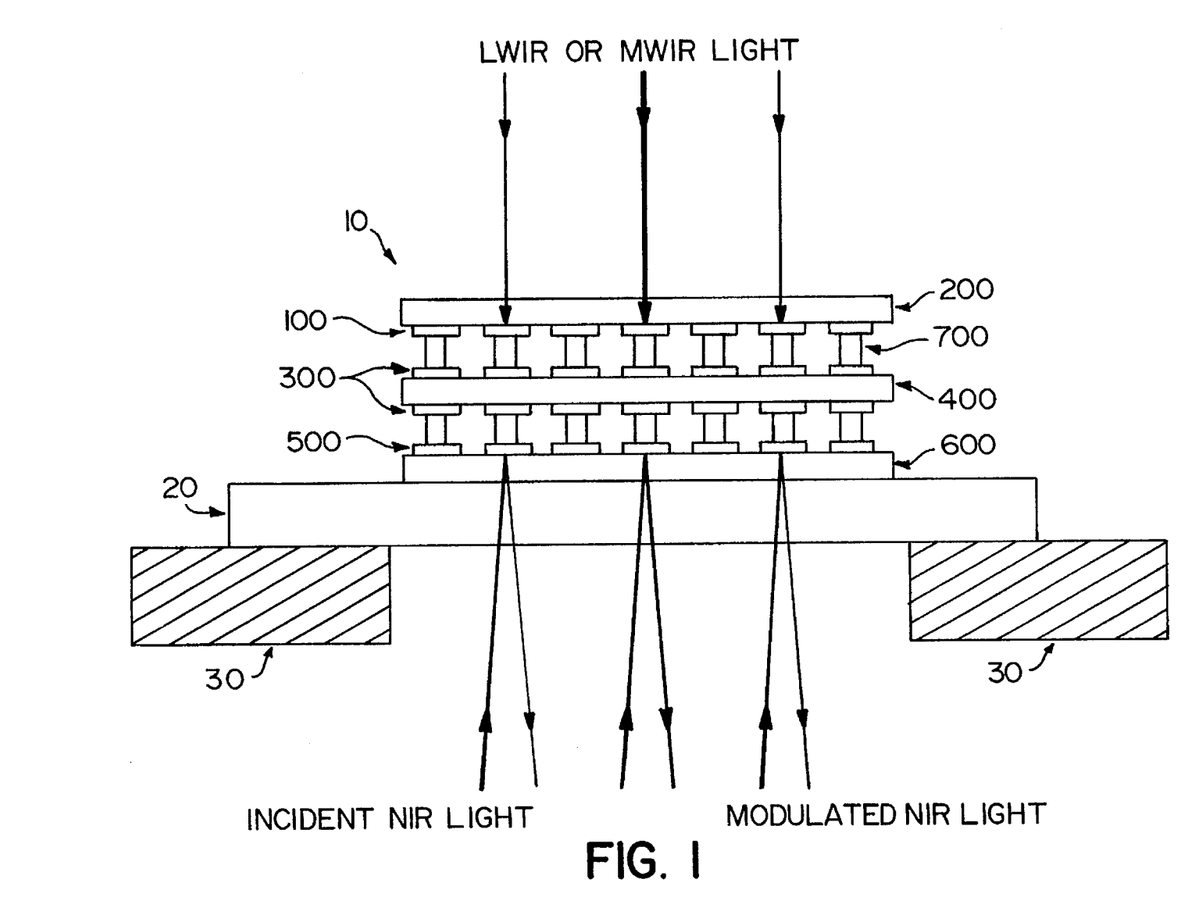
FIG. 1 is a schematic cross-section of a hybrid image converter including an infrared detector array, an electronics section, and an optical modulator array in accordance with Applicants' invention.

FIG. 1 shows a schematic cross-section of a hybrid image converter 10, comprising a QWIP pixel array 100 disposed on a substrate 200, electronic circuit pixels 300 disposed on a substrate 400, and QW optical modulator pixel array 500 disposed on a substrate 600. The hybrid image converter 10 is conveniently disposed on a substrate 20 that is transparent to NIR light and is a good thermal conductor (e.g., sapphire). The transparent substrate 20 is disposed on a cryogenic cold head 30 that cools the substrate 20 and the hybrid image converter 10 to an advantageously low temperature (e.g., 77 Kelvin). In general, the optical modulators can operate at room temperature, but the QWIPs must be cooled to a temperature appropriate for the electronic circuits to generate enough contrast, viz., the QWIP dark current should be low enough for the QWIP photocurrent to be a reasonable fraction, e.g., at least 1%, of that dark current. As a result of such cooling, the performance of the optical modulators actually improves.

Each QWIP pixel in the array 100 advantageously comprises a plurality of n-type QWs disposed between two n-type contact layers that are described in more detail below. The QWIP substrate 200 can be advantageously removed (using, for example, chemo-mechanical polishing) in order to trap LWIR or MWIR light in each pixel, thereby eliminating optical cross-talk among pixels in a large array. The removal of the substrate 200 will advantageously minimize strain in the QWIP array due to thermal-expansion-coefficient mismatch between the QWIPs (that are composed of III–V semiconductors, such as GaAs) and the electronics pixels 300 and substrate 400 (that are usually composed of silicon). This is important because the image converter 10 must cycle many times between room temperature and low (cryogenic) temperatures over the lifetime of the device.

The electronic circuit pixels 300 convert the photocurrents generated in the QWIP pixel array 100 into voltages that are applied to respective QW modulator pixels in the array 500. Via holes (not shown) are used to electrically connect the pixels on one side of the substrate 400 to their respective pixels on the other side of the substrate 400. The electronic circuit pixels may be (but are not limited to being) conventional silicon transimpedance amplifiers (i.e., current-to-voltage converters) disposed on silicon substrates. These circuits and example variations consistent with Applicants' invention are described in more detail below.

Each QW optical modulator pixel in the array 500 advantageously comprises a plurality of undoped QWs disposed between an n-type contact and a p-type contact to form a p-i-n diode or between two n-type contact to form an n-i-n modulator. The modulator substrate 600 can be advantageously removed using chemo-mechanical polishing if the substrate 600 is not transparent to light at the operating wavelength of the QW modulator. The removal of the substrate 600 will also advantageously minimize strain in the QW optical modulator array due to thermal-expansion-coefficient mismatch between the modulator array and the electronics section, as described above for the QWIP.

The QWIP pixels 100 and the QW modulator pixels 500 are electrically connected to the electronic circuits 300 by, for example, indium-bump bonds 700 using such techniques as described in the above-referenced U.S. patent application Ser. No. 08/109,550.

During operation of the hybrid image converter 10 as illustrated in FIG. 1, LWIR or MWIR light is incident through the substrate 200 (if it has not been removed) onto the QWIP pixels 100. (Variations in the intensity of the LWIR or MWIR light are represented in FIG. 1 by variations in the thickness of the arrows.) A beam of uniform-intensity NIR light is directed through the transparent substrate 20 and the substrate 600 (if it has not been removed) onto the QW modulator pixels 500. Pixel-to-pixel variations in the bias on the modulator pixels 500 resulting from the response of the electronic circuit 300 to variations in the intensity of the LWIR or MWIR light cause the intensity or the phase of the NIR light reflected from the QW modulator pixels 500 to be modulated in proportion to the variations in the original LWIR or MWIR light. (Variations in the intensity or phase of the NIR light are also represented in FIG. 1 as variations in the thickness of the arrows.) Thus, a LWIR or MWIR image is converted into an NIR image.

This embodiment of the image converter allows for the independent optimization of the properties of the QWIP array 100, the electronic circuit 300, and the QW optical modulator array 500. For example, since the QWIPs 100 and the QW optical modulators 500 are disposed on different substrates, the growth conditions (e.g., substrate temperature during growth) and the material compositions (e.g., the concentration of aluminum in the AlGaAs layers) of the two sections can be advantageously different to obtain the best performance from each section.

Figure 2:
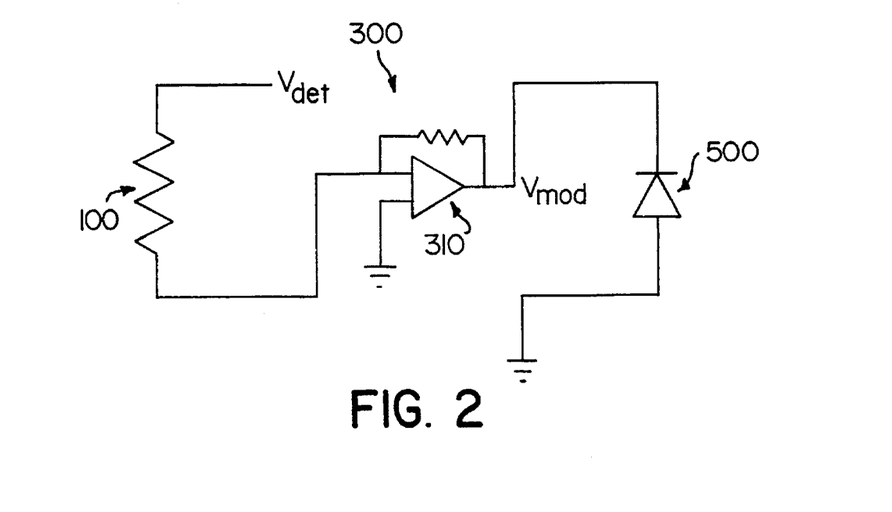
FIG. 2 is an electrical schematic diagram of an infrared detector section, an electronics section, and an optical modulator section of a hybrid image converter in accordance with Applicants' invention.

FIG. 2 shows an electrical schematic diagram of one pixel of the hybrid image converter 10, comprising a QWIP 100 (represented by a resistor), an electronic circuit 300, and a QW optical modulator 500 (represented by a diode). The electronic circuit 300 supplies a voltage bias, $V_{det}$, to the QWIP 100. A transimpedance amplifier 310 converts a photocurrent in the QWIP into a bias, $V_{mod}$, that is applied to the QW modulator 500.

It will be appreciated that the electronic circuit 300 shown in FIG. 2 is merely a schematic representation of a wide variety of circuits that could perform the function of converting current into voltage. Modern semiconductor electronics techniques could be employed to realize more sophisticated circuits that use, for example, gain and offset corrections to the output of the transimpedance amplifier and multiple gain stages to obtain the voltages required to operate the QW modulator 500 (typically in the 1–10-volt range).

Figure 3:
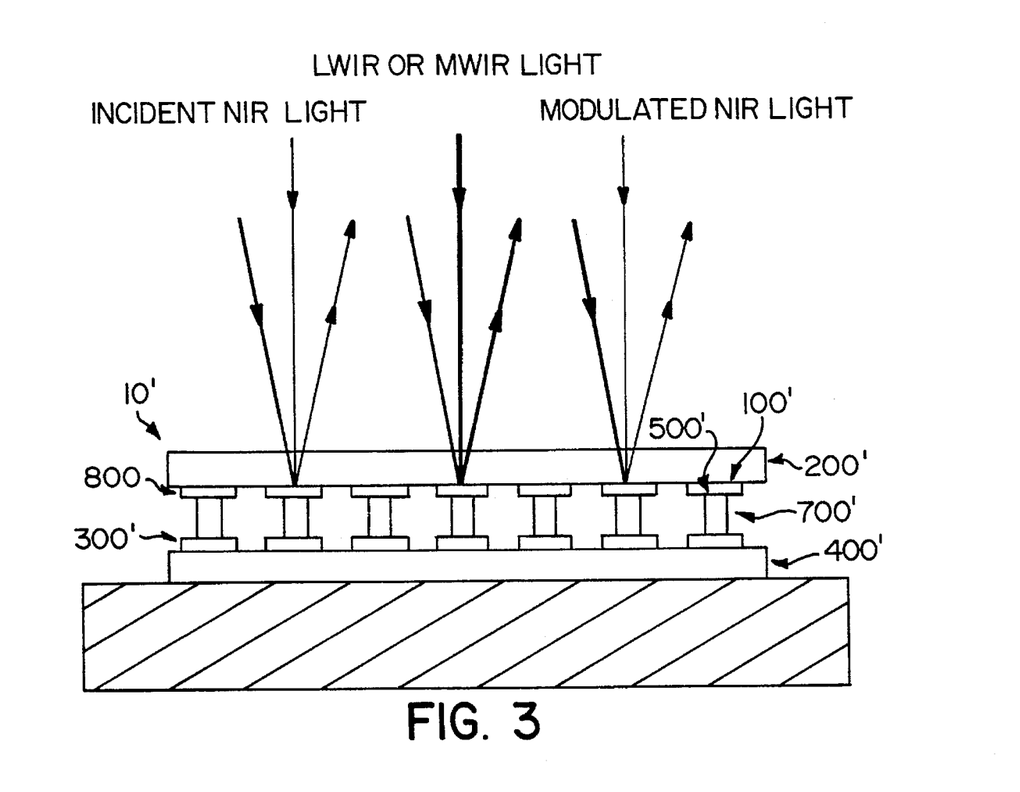
FIG. 3 is a schematic cross-section of an integrated image converter including an integrated infrared detector/optical modulator array and an electronics section in accordance with Applicants' invention.

FIG. 3 shows a schematic cross-section of an integrated image converter 10', comprising an integrated QWIP/QW optical modulator pixel array 800 disposed on a substrate 200' and electronic circuit pixels 300' disposed on a substrate 400'. The QWIP/QW modulator pixels 800 are electrically connected to the electronic circuit pixels 300' using, for example, indium bumps 700', as described above. The integrated image converter 10' is disposed on a cryogenic cold head 30' that cools the device to an advantageously low temperature (e.g., 77 Kelvin).

The integrated QWIP/QW optical modulator pixels 800 and the electronic circuit pixels 300' are described in more detail below. It will be appreciated that the electrical connections represented in FIG. 3 as one indium bump 700' per pixel may, in practice, be more than one electrical connection per pixel, as described below.

As described above for the hybrid image converter 10, the substrate 200' can be advantageously removed using chemo-mechanical polishing to reduce optical cross-talk and to minimize the strain due to the mismatch in thermal expansion coefficients between the detector/modulator section and the electronic circuit section of the integrated image converter 10'.

During operation of the integrated image converter 10' as illustrated in FIG. 3, LWIR or MWIR light is incident through the substrate 200' (if it has not been removed) onto the QWIP/QW modulator pixels 800. (Variations in the intensity of the LWIR or MWIR light are represented in FIG. 3 by variations in the thickness of the arrows.) A beam of uniform-intensity NIR light is also incident through the substrate 200' (if it has not been removed) onto the pixels 800. Pixel-to-pixel variations in the biasses on the modulator sections of the pixels 800 resulting from the response of the electronic circuit 300' to variations in the intensity of the LWIR or MWIR light cause the intensity or the phase of the NIR light reflected from the pixels 800 to be modulated in proportion to the variations in the original LWIR or MWIR image. (Variations in the intensity or phase of the NIR light are also represented in FIG. 3 as variations in the thickness of the arrows.) Thus, the LWIR or MWIR image is converted into an NIR image.

Figure 4:
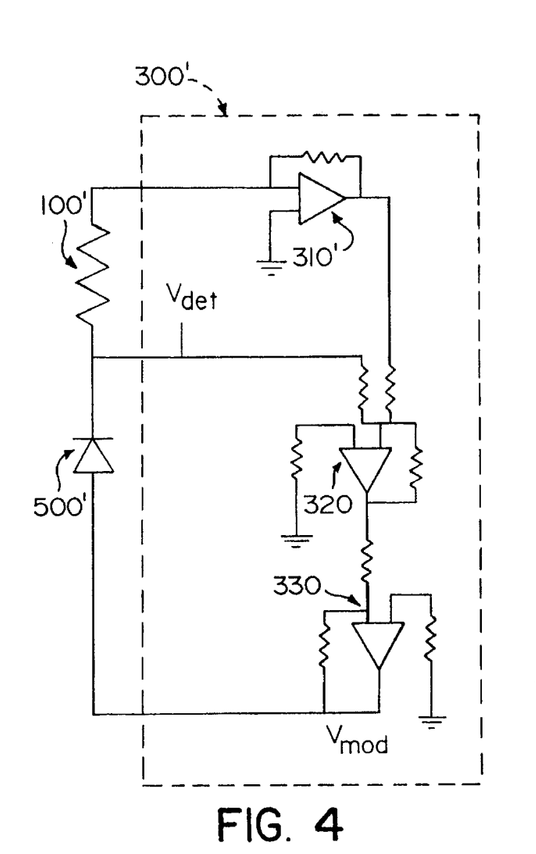
FIG. 4 is an electrical schematic diagram of an integrated image converter including an infrared detector/optical modulator section and an electronics section in accordance with Applicants' invention.

FIG. 4 shows an electrical schematic diagram of one pixel of the integrated image converter 10', comprising a QWIP 100' (represented by a resistor), an electronic circuit 300', and a QW optical modulator 500' (represented by a diode). Here, the QWIP 100' and the QW modulator 500' are shown electrically connected in series because, as explained in more detail below, the two sections are grown one after the other on a common substrate 200'. The electronic circuit 300' supplies the detector bias, $V_{det}$, to the QWIP 100'. A transimpedance amplifier 310' converts a photocurrent in the QWIP into a voltage that is opposite in sign to the detector bias, $V_{det}$, because a transimpedance amplifier such as this one inverts the output. This voltage is added to the detector bias, $V_{det}$, using a voltage adding element 320. The summed bias is inverted with a voltage inverting element 330, and applied to the QW optical modulator 500' as $V_{mod}$. The elements 310', 320, and 330 ensure that the QW optical modulator 500' is reverse-biassed as required for operation.

It will be appreciated that the electronic circuit 300' shown in FIG. 2 is merely a schematic representation of a wide variety of circuits that could perform the function of converting current into voltage. Modern semiconductor electronics techniques could be employed to realize more sophisticated circuits that use, for example, gain and offset corrections to the output of the transimpedance amplifier 310' and multiple gain stages to obtain the voltages required to operate the QW modulator 500' (typically in the 1–10-volt range).

Figure 5:
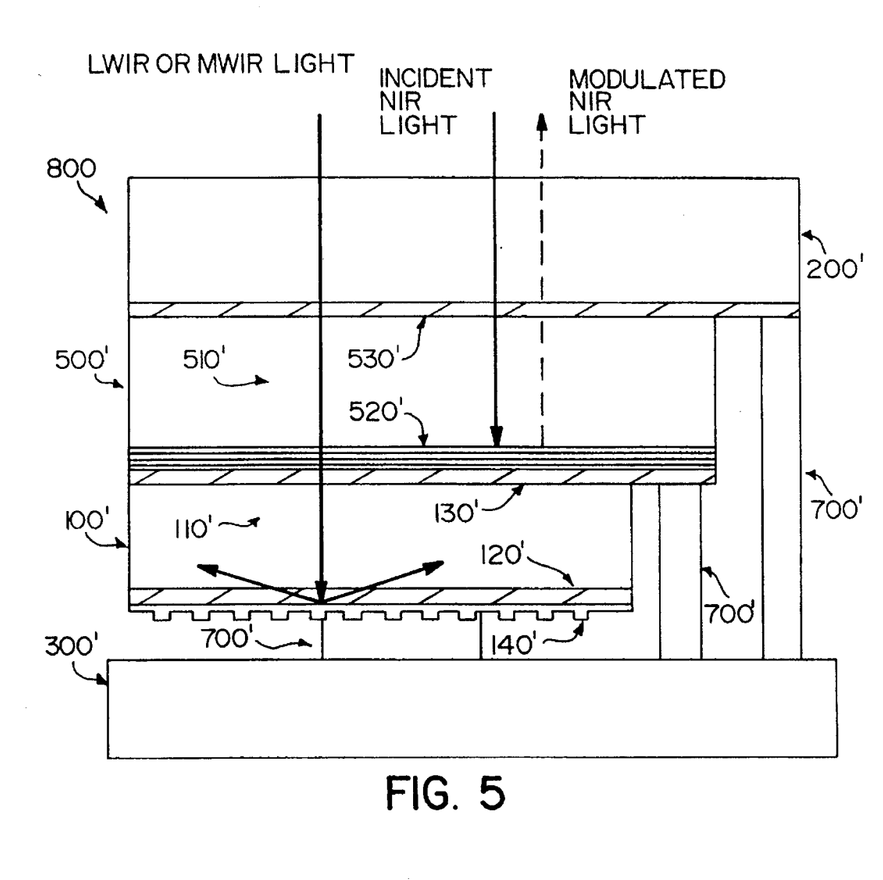
FIG. 5 is a schematic cross-section of a single pixel of an integrated image converter connected to the electronics section in a first way that is in accordance with Applicants' invention.

FIG. 5 shows a schematic cross-section of the epitaxial layer structure of one pixel 800 of the integrated image converter, comprising a QWIP section 100', and a QW modulator section 500' disposed on a substrate 200'. As described in more detail below, the materials used in the QWIP section 100' are similar to those used in the QW modulator section 500'; thus, sequential growth (using, for example, molecular beam epitaxy) is not a problem. The pixel 800 is shown in FIG. 5 electrically connected to the electronic circuit pixel 300' using indium bumps 700'.

The QWIP section 100' advantageously contains a plurality of n-type QWs 110' disposed between two n-type contact layers 120' and 130'. In addition, the QWIP section 100' includes a grating 140' or other means for coupling LWIR or MWIR light of the appropriate polarization (i.e., perpendicular to the quantum well layers 110' as required by the polarization selection rules for intersubband optical absorption) into the QWIP section 100'.

The QW modulator section 500' advantageously contains a plurality of undoped QWs 510' disposed between an n-type contact layer 520' and a p-type contact layer 530', thus forming the intrinsic (i) region of a p-i-n diode. It will be appreciated that the contact layer 530' could be doped n-type to form an n-i-n optical modulator if it is necessary to modify the resistance of the modulator section as described below for other embodiments of Applicants' invention.

The contact layer 520' could be composed of the same material and doped to the same level as the QWIP contact layer 130'. In this case, the two contact layers 130' and 520' would form a single continuous layer that electrically connects the QWIP section 100' to the QW modulator section 500'. In another embodiment, the contact layer 520' could advantageously comprise a dielectric mirror that has high reflectivity (>99%) at the NIR operating wavelength of the QW modulator section 500' (as described in the above-referenced K.-K. Law et al. papers). This would prevent the NIR light from entering the QWIP section 100' (where in some QWIP designs it would be absorbed thereby degrading the performance of the modulator and producing unwanted photocurrents in the QWIP section 100', i.e., crosstalk). It would also prevent the NIR light from diffracting (or scattering) from the grating 140'. Diffraction (or scattering) of the NIR light at the grating 140' could degrade the quality of the NIR image.

The array of pixels 800 can be defined using standard semiconductor lithography and etching techniques. A typical pixel would be a square having dimensions of about 50 micrometers (μm) by about 50 μm defined by etching away the material around the pixel to expose the contact layer 530' nearest the substrate 200'. In most applications, the contact layer 530' is common to all of the pixels of the array and thus requires only one electrical contact instead of one per pixel. A second etch step is used to expose a small area of the intermediate contact layers 130' and 520'. The grating 140' is usually etched into the contact layer 120' and coated with a thin metal film.

As shown in FIG. 5, indium bumps 700' are used to connect the QWIP contact 120', the common intermediate contact (130' and 520'), and the QW modulator contact 530' to the electronic circuit 300'. In this embodiment, an electronic circuit 300' such as the one shown in FIG. 4 would be used to control the integrated image converter pixel 800.

A typical QW section 510' of the optical modulator 500' comprises a plurality (e.g., 80) undoper GaAs quantum wells each with a thickness of, for example, 10 nm and separated by cladding layers composed of, for example, $Al_{(0.3)}Ga_{(0.7)}As$ layers each with a thickness of, for example, 5 nm. The mirror contact layer 520' comprises a plurality (e.g., 10) of alternating layers of, for example, $Al_{(0.3)}Ga_{(0.7)}As$ and AlAs. The contact layer 530' is typically composed of GaAs.

An advantageous design for the QW section 110' of the QWIP 100' is described in commonly assigned U.S. patent application Ser. No. 07/906,417, filed Jun. 30, 1992, by John W. Little, Jr., which is expressly incorporated here by reference. It is called the miniband-transport (MBT) quantum well infrared detector. An example MBT structure for operation in the LWIR band comprises a plurality (e.g., 40) of n-type GaAs QWs each with a thickness of, for example, 8 nm, separated by superlattice barrier layers. The superlattice barriers comprise a plurality (e.g., 10) of alternating layers of, for example, GaAs and $Al_{(0.3)}Ga_{(0.7)}As$ with thicknesses (e.g., 1.5 nm and 4 nm, respectively) chosen so that a miniband of energy states is formed in the barrier layers that serves as a high-mobility channel for carriers photoexcited out of the Qws.

The MBT design is advantageous for use in the integrated image converter as compared with other QWIP designs because it allows more flexibility in the choice of material compositions. For example, the same aluminum concentration can be used in all of the AlGaAs layers in both the QW modulator section 500' and the QWIP section 100' making sequential growth of these sections on a common substrate much less complicated than when the aluminum concentrations are different.

Figure 6:
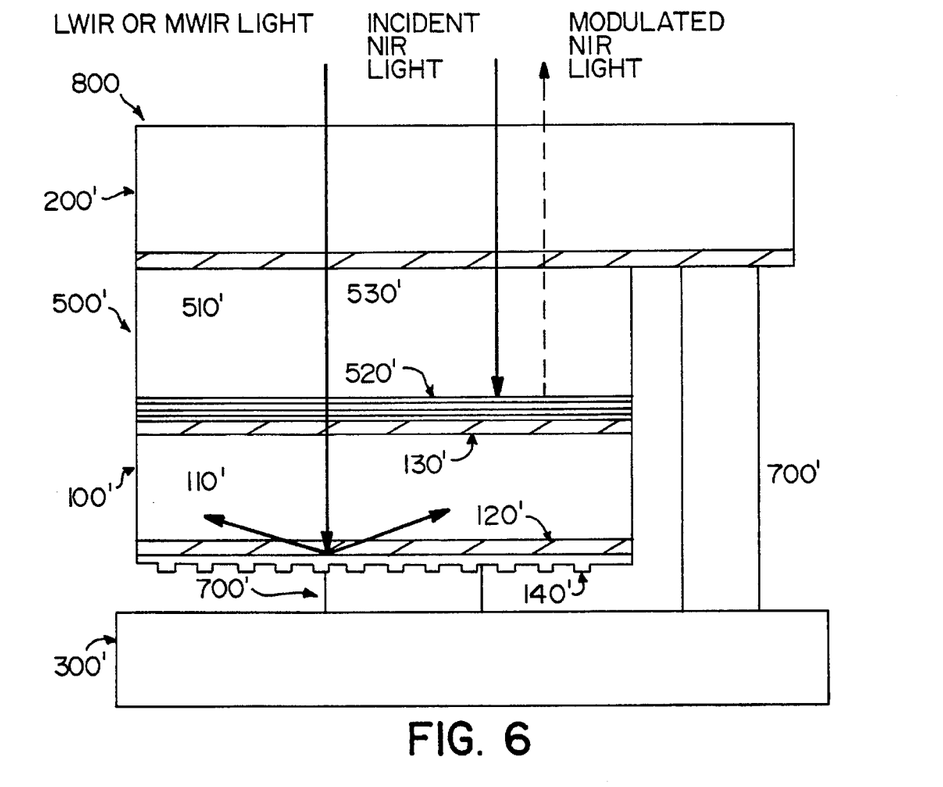
FIG. 6 is a schematic cross-section of a single pixel of an integrated image converter connected to the electronics section in a second way that is in accordance with Applicants' invention.
Figure 7:
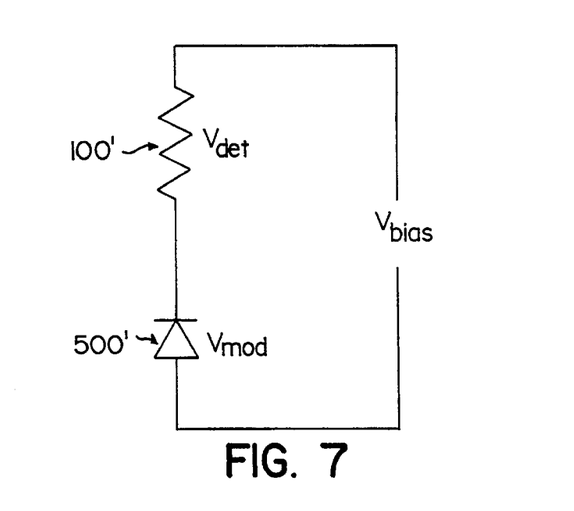
FIG. 7 is an electrical schematic diagram of an integrated image converter connected to the electronics section in a second way that is in accordance with Applicants' invention.

A particularly simple embodiment of the integrated image converter is illustrated by FIG. 6, which shows a schematic cross-section of the epitaxial layer structure of one pixel having generally the same components as shown in FIG. 5. Here, the electronic circuit 300' is a simple voltage source that is connected to the pixel 800 at only two points, the contact 120' and the contact 530' (i.e., the intermediate contacts 130' and 520' are not connected to the electronic circuit). An electrical schematic diagram of this embodiment of the integrated image converter is shown in FIG. 7. The QWIP section 100' and the QW modulator section 500' are connected in series, and a bias, $V_{bias}$, is applied across the series circuit. Part of $V_{bias}$ will appear across the QWIP section 100' (and is labeled $V_{det}$ in FIG. 7), and part of $V_{bias}$ will appear across the QW modulator section 500' (and is labeled $V_{mod}$ in FIG. 7). Photoinduced changes in the resistance of the QWIP section 100' cause changes in the distribution of the bias in the series circuit, thereby changing the bias on the modulator section 500'.

Such a voltage divider arrangement is effective only when a substantial fraction of the total current flowing through the QWIP is photocurrent rather than thermally-generated (dark) current (i.e., the QWIP is background limited). This requires low operating temperature or shorter-wavelength (MWIR) QWIP response. Because of the simplicity of the electronics, this mode would be useful for low-cost imaging systems such as the front end of an image intensifier for viewing MWIR scenes.

Analysis of the electrical equivalent circuit shown in FIG. 7 shows that the change in bias on the modulator, $\Delta V_{mod}$, is related to the fractional change in resistance of the QWIP, $\Delta R_{det}/R_{det}$, by the following expression:

$$\Delta V_{mod} = -V_{bias} \cdot \frac{R_{mod}/R_{det}}{(1+R_{mod}/R_{det})^2} \cdot \Delta R_{det}/R_{det} \qquad \text{Eqn. 1}$$

where $V_{bias}$ is the total bias voltage on the pixel, and $R_{mod}$ and $R_{det}$ are the effective resistances of the modulator 500' and the QWIP 100', respectively. For a fixed a $\Delta R_{det}/R_{det}$, $\Delta V_{mod}$ is maximized when $R_{det}$ equals $R_{mod}$. Under these conditions, the bias on the modulator is $V_{bias}/2$, which gives the fractional change in the modulator bias according to the following:

$$V_{mod}/V_{mod} = -\tfrac{1}{2} \cdot \Delta R_{det}/R_{det} \qquad \text{Eqn. 2}$$

An example MWIR MBT comprises a plurality (e.g., 40) of n-type $In_{(0.1)}Ga_{(0.9)}As$ quantum wells with thickness of, for example, 4 nm separated by superlattice barriers comprising a plurality (e.g., 10) of alternating layers of $Al_{(0.3)}Ga_{(0.7)}As$ and $Al_{(0.5)}Ga_{(0.5)}As$ with thicknesses of, for example, 2 nm and 3 nm, respectively.

For an MWIR QWIP having the structure described above, resistances ranging from $1\times10^{10}$ ohms to $1\times10^{11}$ ohms have been measured at 80K; these are comparable to the effective resistance of a reverse-biassed p-i-n diode, i.e., the resistance of the QW modulator section 500'. The fractional change in resistance of the QWIP 100' measured by changing the input image from a 300-K blackbody to a 500-K blackbody was found for one sample to be about 0.37 at a QWIP bias of four volts.

When such a QWIP is connected in series with a modulator and a bias of about ten volts is applied, the bias voltage would be divided approximately equally between the QWIP section 100' and the modulator section 500', and the bias change on the modulator for about 0.4 fractional change in detector resistance would be (from Eqn. 2) about one volt. For the relatively sharp absorption linewidth obtained in the QW modulators at 80K, this should be sufficient to cause a reasonably large change in the absorption of the NIR light in the modulator section.

Figure 8A:
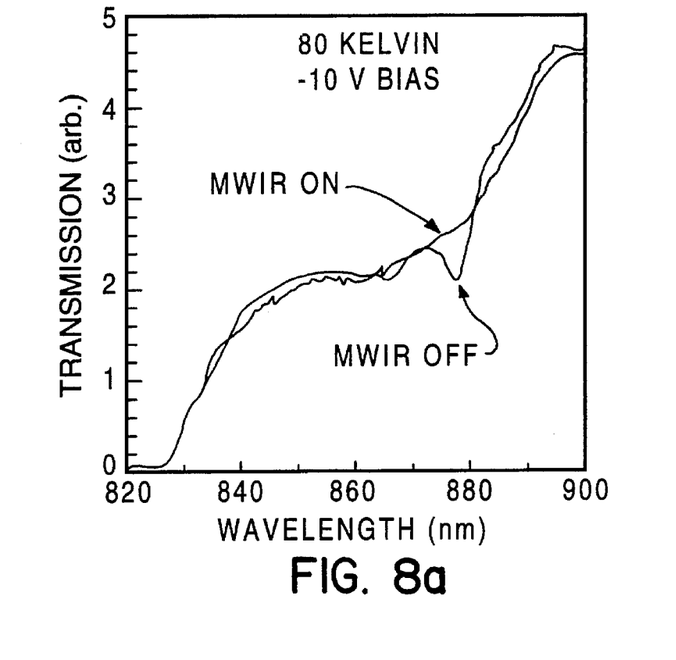
FIGS. 8a and 8b illustrate the conversion of variations in the intensity of MWIR light into variations in the intensity of NIR light using one embodiment of Applicants' invention.
Figure 8B:
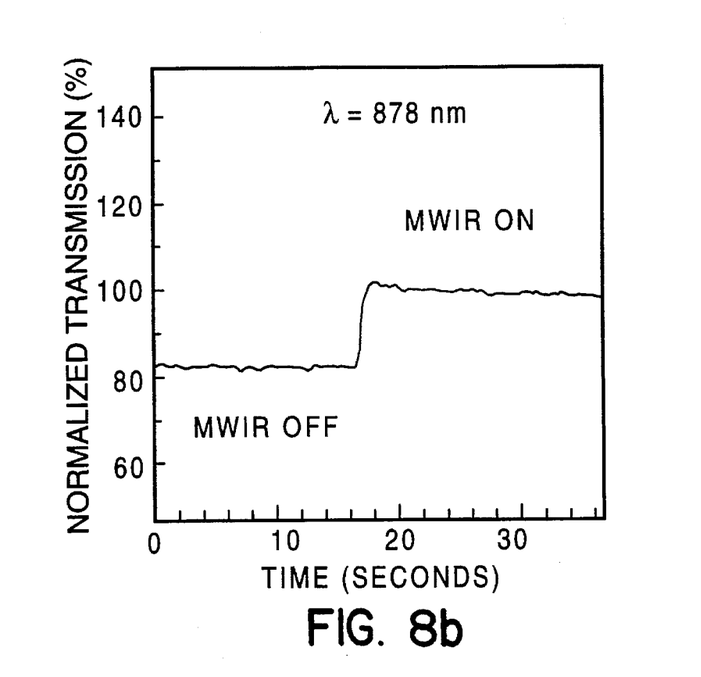

FIGS. 8a and 8b show experimental results of the conversion of variations in the intensity of MWIR light into variations in the intensity of NIR light using one embodiment of the integrated image converter biased in series as shown in FIG. 6. In this device, the QWs 510' in the modulator section were composed of $In_{(0.08)}Ga_{(0.92)}As$ with thicknesses of 10 nm. FIG. 8a shows the transmission of the device in the NIR region of the spectrum with and without light from an MWIR source incident on the pixel. The dip in transmission around 880 nm for the "MWIR off" curve was due to exciton absorption. The sharp dip flattened out and shifted to longer wavelength when the MWIR source was turned on. This was the same behavior that was observed in the NIR spectrum when the bias was increased. This implied that more bias appeared across the QW modulator section 500' when the MWIR light was on than when it was off. This was consistent with the description of the redistribution of voltages due to a decrease in the resistance of the QWIP in the presence of MWIR light.

FIG. 8b shows the transmission of the sample at a wavelength of 878 nm in the absence and presence of MWIR light. (The horizontal axis refers to the time at which a shutter was opened to allow the MWIR light to illuminate the pixel). The change in the intensity of the NIR light (indicated by the change in transmission) in response to the change in the intensity of the MWIR light is direct evidence of image conversion by the integrated image converter pixel 800.

The excitonic absorption did not remain sharp under application of an electric field in this tested sample. This was presumably due to a problem with the sample quality caused by strain in the lattice-mismatched InGaAs quantum wells.

Figure 9A:
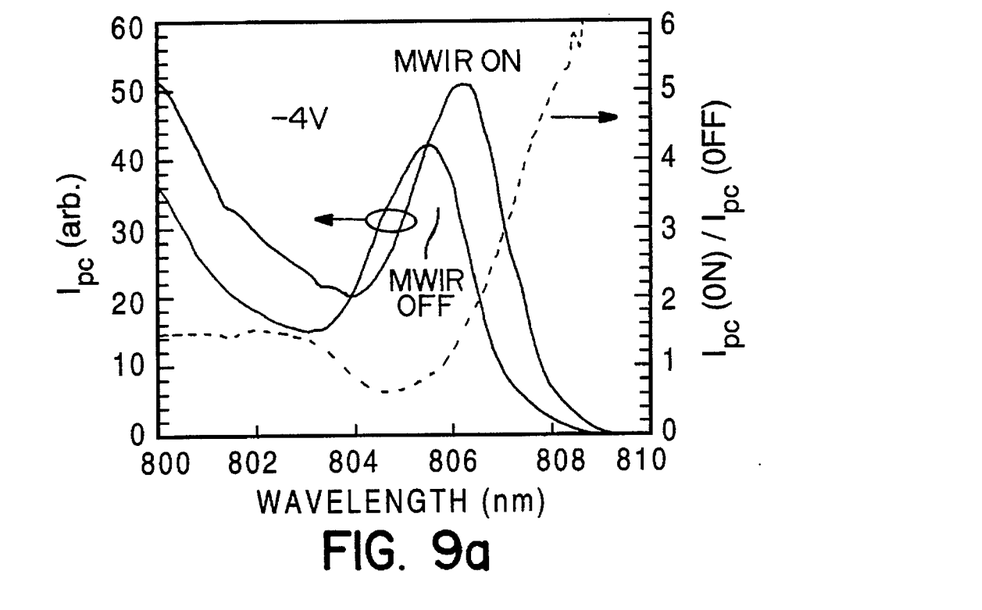
FIGS. 9a and 9b illustrate the conversion of variations in the intensity of MWIR light into changes in the NIR absorption properties using a second embodiment of Applicants' invention.
Figure 9B:
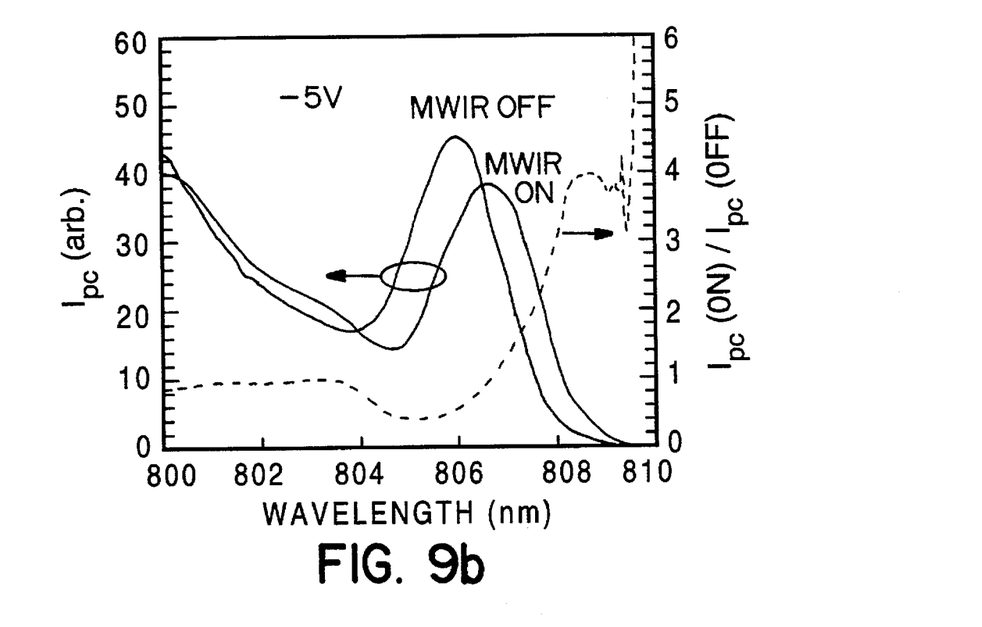

FIGS. 9a and 9b show experimental results of image conversion in a 30 second embodiment of the integrated image converter using the series-bias scheme shown in FIG. 6 (biassed at –4 V and –5 V, respectively). In this sample, the QWs 510' were composed of high-quality GaAs with thicknesses of about 10 nm, and the QWIP section was similar to that described above for MWIR operation. Photocurrent $I_{pc}$ versus wavelength (in the NIR spectral region) was measured instead of transmission because the GaAs substrate was opaque to the operating wavelength of the modulator. In this type of measurement, the photocurrent signal is proportional to the absorption strength in the sample, and peaks in the photocurrent indicate exciton absorption. The left vertical axes in FIGS. 9a and 9b are relative photocurrent (labeled $I_{pc}$) and the right vertical axes are the ratios of the photocurrent with MWIR light on the sample to the photocurrent with the MWIR light off. For both –4 V bias and –5 V bias (FIGS. 9a and 9b, respectively), the exciton absorption feature remained sharp and shifted to longer wavelength with the MWIR light on compared with the MWIR light off, indicating a redistribution in the bias due to the presence of MWIR light as described above. The on/off ratios were in the range of 4 to 5, implying that NIR modulation depths of this magnitude would be obtained for operation as an image converter.

Applicants' invention has been described above in terms of specific embodiments. It will be readily appreciated by one of ordinary skill in the art, however, that the invention is not limited to those embodiments, and that, in fact, the principles of the invention may be embodied and practiced in other devices and methods. Therefore, the invention should not be regarded as delimited by those specific embodiments but by the following claims.

What is claimed is:

1. A device for converting variations in light having wavelengths in a first predetermined range into variations in light having wavelengths in a second predetermined range, said device comprising:

a substrate;

an absorption modulator comprising a plurality of quantum wells having an absorption due to heavy-hole excitons which is maximal at wavelengths in the second predetermined range when a predetermined bias is applied to the modulator;

a photodetector comprising a multilayer structure including a plurality of quantum wells, each quantum well having a bound ground energy state and a bound excited energy state, and a plurality of superlattice barrier layers interleaved between said quantum wells, each of said superlattice barrier layers having a miniband of energy states in resonance with the excited energy states of its adjacent quantum wells, said minibands and excited energy states providing an electrically continuous channel across said wells and layers for carriers excited from said ground energy states to said excited energy states and minibands by absorption of photons having wavelengths in said first predetermined range, said photodetector being electrically connected said absorption modulator; and biasing means, electrically connected to said absorption modulator and to said photodetector, for supplying bias to said absorption modulator and to said photodetector;

wherein said electrically connected photodetector and absorption modulator are disposed on said substrate, and, when light having a first intensity and wavelengths in the first predetermined range is incident on the photodetector and light having a second intensity, a second phase, and wavelengths in the second predetermined range is incident on the absorption modulator, variations in the first intensity generate variations in the bias on the absorption modulator such that at least one of the second intensity and the second phase is varied.

2. The device of claim 1, comprising a two-dimensional array of said absorption modulators, a two-dimensional array of said photodetectors, and a plurality of supplying means, wherein each of said photodetectors is electrically connected to a respective one of said absorption modulators to thereby define photodetector-modulator pairs, and each one of said photodetector-modulator pairs is electrically connected to a respective one of said supplying means and is disposed on said substrate.

3. The device of claim 1, wherein said photodetector is vertically integrated with said absorption modulator.

4. An image converter for converting a first image having wavelengths in a first predetermined range into a second image having wavelengths in a second predetermined range, said image converter comprising;

an array of photodetectors arranged in a pixel format and disposed on a first substrate, wherein each photodetector comprises a multilayer structure including a plurality of quantum wells, each quantum well having a bound ground energy state and a bound excited energy state, and a plurality of superlattice barrier layers interleaved between the quantum wells, each superlattice barrier layer having a miniband of energy states in resonance with the excited energy states of its adjacent quantum wells, and the minibands and excited energy states provide an electrically continuous channel across the wells and layers for carriers excited from the ground energy states to the excited energy states and minibands by absorption of photons having wavelengths in the first predetermined range and, when a first image is incident on the converter, generating a photocurrent having a magnitude proportional to an intensity of a respective pixel of the first image;

an electronics section disposed on a second substrate; and an array of optical modulators arranged in a pixel format and disposed on a third substrate, each optical modulator comprising a plurality of quantum well modulator layers having a predetermined thickness and an absorption due to heavy-hole excitons that varies at wavelengths in the second predetermined range in accordance with a voltage applied to the optical modulator;

wherein the electronics section is sandwiched between and electrically connected to the photodetectors and the optical modulators and is for converting, when a first image is incident on the converter, photocurrents generated by the photodetectors into voltages applied to respective ones of the optical modulators to convert the first image into the second image.

5. An integrated image converter for converting an infrared image having wavelengths in a first predetermined range into a second image having wavelengths in a second predetermined range, said converter comprising:

a first substrate;

an infrared detector array section comprising a plurality of infrared detectors arranged in a pixel format, wherein each infrared detector comprises a multilayer structure including a plurality of quantum wells, each quantum well having a bound ground energy state and a bound excited energy state, and a plurality of superlattice barrier layers interleaved between the quantum wells, each superlattice barrier layer having a miniband of energy states in resonance with the excited energy states of its adjacent quantum wells, and the minibands and excited energy states provide an electrically continuous channel across the wells and layers for carriers excited from the ground energy states to the excited energy states and minibands by absorption of photons having wavelengths in the first predetermined range, for generating, when the infrared image is incident upon the converter, a photocurrent having a magnitude proportional to an intensity of a respective pixel of the incident infrared image;

an optical modulator array section comprising a plurality of optical modulators arranged in a pixel format, each optical modulator for absorbing light having wavelengths in the second predetermined range in accordance with a voltage applied to the optical modulator; and an electronics section disposed on a second substrate and comprising a plurality of means for converting a photocurrent generated by an infrared detector into a voltage;

wherein the infrared detector array section and the optical modulator array section are disposed one on top of another and on the first substrate, and the plurality of converting means are electrically connected on a pixel-by-pixel basis to one of the infrared detector array section and the optical modulator array section to apply the voltages converted from the photocurrents to respective ones of the optical modulators and convert the infrared image into the second image.

6. In a semiconductor device, a method of converting light having wavelengths in a first predetermined range into light having wavelengths in a second predetermined range comprising the steps of:

converting the light having wavelengths in the first predetermined range into an electric current, using an infrared detector which comprises a multilayer structure including a plurality of quantum wells, each quantum well having a bound ground energy state and a bound excited energy state, and a plurality of superlattice barrier layers interleaved between the quantum wells, each superlattice barrier layer having a miniband of energy states in resonance with the excited energy states of its adjacent quantum wells, and the minibands and excited energy states provide an electrically continuous channel across the wells and layers for carriers excited from the ground energy states to the excited energy states and minibands by absorption of photons having wavelengths in the first predetermined range, the electric current having a magnitude determined by an intensity of the converted light;

converting the electric current into an electric voltage having a magnitude proportional to the magnitude of the electric current; and controlling at least one of an intensity and a phase of the light having wavelengths in the second predetermined range in response to the electric voltage.

* * * * *